(12) United States Patent
Gorissen et al.

(10) Patent No.: US 9,921,813 B2
(45) Date of Patent: Mar. 20, 2018

(54) COMPILER GENERATING OPERATOR FREE CODE

(71) Applicant: KONINKLIJKE PHILIPS N.V., Eindhoven (NL)

(72) Inventors: Paulus Mathias Hubertus Mechtildis Antonius Gorissen, Eindhoven (NL); Ludovicus Marinus Gerardus Maria Tolhuizen, Waalre (NL); Mina Deng, Shanghai (CN); Wilhelmus Petrus Adrianus Johannus Michiels, Reusel (NL); Wicher I. Gispen, Waalre (NL); Constant Paul Marie Jozef Baggen, Blerick (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/435,595

(22) PCT Filed: Oct. 30, 2013

(86) PCT No.: PCT/EP2013/072668
§ 371 (c)(1),
(2) Date: Apr. 14, 2015

(87) PCT Pub. No.: WO2014/072209
PCT Pub. Date: May 15, 2014

(65) Prior Publication Data
US 2015/0277865 A1    Oct. 1, 2015

Related U.S. Application Data

(60) Provisional application No. 61/723,410, filed on Nov. 7, 2012.

(30) Foreign Application Priority Data

Feb. 27, 2013  (EP) .................................... 13156991

(51) Int. Cl.
*G06F 9/45*   (2006.01)
*G06F 21/14*  (2013.01)

(52) U.S. Cl.
CPC .............. *G06F 8/425* (2013.01); *G06F 8/447* (2013.01); *G06F 8/52* (2013.01); *G06F 21/14* (2013.01)

(58) Field of Classification Search
CPC . G06F 8/443; G06F 8/41; G06F 8/437; G06F 9/45516; G06F 9/44521
See application file for complete search history.

(56) References Cited

U.S. PATENT DOCUMENTS 5,781,752 A * 7/1998 Moshovos ............ G06F 9/3834
                                                        712/216
7,673,109 B2   3/2010 Wrighton et al.
(Continued)

FOREIGN PATENT DOCUMENTS

EP    0905616 A2   3/1999
EP    2482184 A1   8/2012
(Continued)

OTHER PUBLICATIONS

Zhang et al: "A Special-Purpose Compiler for Look-Up Table and Code Generation for Function Evaluation"; 2010 Design, Automation & Test in Europe Conference & Exhibition, IEEE, Mar. 2010, pp. 1130-1135.
(Continued)

*Primary Examiner* — Li B Zhen
*Assistant Examiner* — Lenin Paulino

(57) ABSTRACT

A compiler 134 for compiling a first computer program 110 written in a first computer programming language into a second computer program written in a machine language, the compiler comprises a code generator to generate the second computer program by generating tables 142 and
(Continued)

machine language code 144, the generated tables and the generated machine language code together forming the second computer program, wherein the generated machine language code references the tables and the generated machine language code does not contain arithmetic or logic machine instructions, the tables comprising pre-computed results of arithmetic and/or logic machine instructions.

15 Claims, 5 Drawing Sheets

(56) References Cited

U.S. PATENT DOCUMENTS

| | | | |
|---|---|---|---|
| 7,796,671 B2 | 9/2010 | Peng et al. | |
| 2004/0078588 A1* | 4/2004 | Chow | G06K 19/07363 726/36 |
| 2007/0079296 A1* | 4/2007 | Li | G06F 9/45516 717/136 |
| 2007/0126049 A1 | 6/2007 | Moharir et al. | |
| 2009/0228717 A1* | 9/2009 | Futa | G06F 21/14 713/190 |
| 2011/0214110 A1* | 9/2011 | Baron | G06F 8/443 717/153 |

FOREIGN PATENT DOCUMENTS

| | | |
|---|---|---|
| JP | 2000194567 A | 7/2000 |
| JP | 2007126049 A1 | 9/2009 |
| RU | 2009120207 A | 12/2010 |

OTHER PUBLICATIONS

Malagon et al: "Compiler Optimizations as a Countermeasure Against Side-Channel Analysis in MSP430-Based Devices"; Sensors, vol. 12, No. 12, Jun. 2012, pp. 7994-8012.

Mamiya et al: "Efficient Countermeasures Against RPA, DPA, and SPA"; Cryptographic Hardware and Embedded Systems—CHES 2004, Lecture Notes in Computer Science, 2004, pp. 343-356.

Eisenbarth et al: "Building a Side Channel Based Disassembler"; Springer Transactions on Computationsl Science, Special Issue on "Security in Computing"; 2010, pp. 78-99.

* cited by examiner

COMPILER GENERATING OPERATOR FREE CODE

CROSS-REFERENCE TO PRIOR APPLICATIONS

This application is the U.S. National Phase application under 35 U.S.C. § 371 of International Application No. PCT/EP2013/072668, filed on Oct. 30, 2013, which claims the benefit of U.S. Provisional Patent Application No. 61/723,410, filed on Nov. 7, 2012 and European Patent Application No. 13156991.5, filed on Feb. 27, 2013. These applications are hereby incorporated by reference herein.

FIELD OF THE INVENTION

The invention relates to a compiler for compiling a first computer program written in a first computer programming language into a second computer program, the compiler comprises a code generator to generate the second computer program by generating machine language code.

The invention further relates to a computer configured as a compiler and a compiling method.

BACKGROUND OF THE INVENTION

It has long been known that computer systems leak some information through so-called side-channels. Observing the input-output behavior of a computer system may not provide any useful information on sensitive information, such as secret keys used by the computer system. But a computer system has other channels that may be observed, e.g., its power consumption or electromagnetic radiation; these channels are referred to as side-channels. For example, small variations in the power consumed by different instructions and variations in power consumed while executing instructions may be measured. The measured variation may be correlated to sensitive information, such as cryptographic keys. This additional information on secret information, beyond the observable and intended input-output behavior are termed side-channels.

Through a side-channel a computer system may 'leak' secret information during its use. Observing and analyzing a side-channel may give an attacker access to better information than may be obtained from cryptanalysis of input-output behavior only. One known type of side-channel attack is the so-called differential power analysis (DPA).

Both implementations of functionality in computer hardware and computer software are vulnerable to side-channel attacks. The problem is however most severe in software. Compared to hardware implementations, software is relatively slow and consumes a relatively large amount of power. Both factors favor side-channel attacks.

Attempts have been made to increase the resistance of computer programs against side-channel attacks by changing their compilation.

U.S. Pat. No. 7,996,671 suggests increasing the resistance of computer programs against side-channel attacks by improved compilation. Since power analysis attacks rely on measured power consumption, resistance is increased by compiling so as to reduce power consumption. The compiler predicts the compilation that is the most energy efficient and selects it. It is observed that energy consumption reduction increases the power noise/variation and improves side-channel resistance.

If the energy reduction approach alone is not enough to introduce enough power noise/variation, then the compiler approach that is used for energy optimization can be used to randomize the power cost in critical portions of codes such as cryptographic algorithms. This is accomplished at compile time by deliberately generating code with different power requirements.

Current approaches to the side-channel problem that introduce randomness in the computation have proved less than satisfactory. Even though obscured, some relationship between power consumption and sensitive computations remains. Given sufficient power-measurements and statistical analysis, countermeasures based on randomness may be ineffective.

SUMMARY OF THE INVENTION

It would be advantageous to have an improved compiler to address these and other security concerns.

The inventors have observed that leakage of information on secret data, such as cryptographic keys, is caused in the first place by the usage of arithmetic and logical circuits of machine code instructions that act upon secret data. If it were possible to avoid such instructions in the first place, one of the root causes of side-channel leakage would be addressed.

Aspects of the invention are defined in the independent claims. The dependent claims define advantageous embodiments.

A compiler is provided for compiling a first computer program written in a first computer programming language into a second computer program. The second computer program may be a machine programming language, but could more in general be any computer programming language. The compiler comprises a code generator to generate the second computer program by generating tables and machine language code, the generated tables and the generated machine language code together forming the second computer program, the generated machine language code referencing the tables, wherein the compiler is configured to identify an arithmetic or logical expression in the first computer program, the expression depending on at least one variable or data item, and the code generator is configured to generate one or more tables representing pre-computed results of the identified expression for multiple values of the variable and to generate machine language code to implement the identified expression in the second computer program by accessing the generated one or more tables representing pre-computed results.

Side-channel leakage of the second computer program is lower because it does contain fewer arithmetic or logic operations. Ideally all arithmetic and logical expressions and sub-expressions are replaced by table accesses. Since those instructions which constitute the arithmetic or logical expression or sub expressions are absent they cannot leak any information. The table is pre-computed; the power consumed to perform the arithmetic or logical behavior enclosed in the table is not visible during execution of the program.

Furthermore, since the instruction set has been reduced it is much harder to reconstruct the program that is executed. Indeed, side-channel information has been used in the past to recover large parts of the program executed on an embedded processor. See for example, "Building a Side channel Based Disassembler", by Thomas Eisenbarth, Christof Paar, and Björn Weghenkel, Springer Transactions on Computational Science, Special Issue on "Security in Computing", 2010. Side-channel based disassembly, typically reveals the types of the instructions not the operands. The reasons being that the operand require more fine-grained statistical analysis, say using DPA. So, by reducing the number of types of instructions used less information is revealed from knowing the types of instructions. In the extreme, when operator free compilation is used, the disassembly will reveal little more than that load and store operations are used, something which is clear even before disassembly is started. So, for example, if a proprietary cryptographic algorithm is implemented using fewer instructions is becomes harder to reverse engineer the cryptographic algorithm from side-channel information.

The compiler produces a second program that is at least semantically equivalent to the first program, although the second program could do more than the first program.

The first computer program may be part of a larger computer program. In that case the compiler compiled only part of the larger computer program. This is advantageous since operator free compilation typically requires large amounts of memory. It is therefore advantageous to limit operator free compilation to the more important parts of the larger program. Similarly the second computer program may be part of a larger second computer program. The larger second computer program need not have been compiled operator free in its entirety.

Usually, the compiler will identify more than one expression, such as the arithmetic or logical expression. The pre-computed results may be related to the identified expression. There may be more than one variable on which the expression depends. In this case, the tables may represent pre-computed results for multiple values of the variables. The compiler may have decision logic to decide to split an expression, depending on multiple variables, into a combination of smaller expressions which depend on fewer variables.

In an embodiment, the variable on which the expression depends is correlated with security related data, such as a cryptographic key.

In an embodiment the second computer program is written in the machine language.

In an embodiment, the machine language code generated to implement the identified expression does not contain arithmetic or logic machine instructions.

In an embodiment, the machine language code generated to implement the identified expression does not contain arithmetic or logic and does not contain conditional machine instructions. Note that it is advantageous to avoid both arithmetic or logic machine instructions as well as the conditional instructions. In an embodiment the second computer program does not contain arithmetic or logic and/or does not contain conditional machine instructions. Preferably, at least the expressions having an input that depends on or is correlated with at least part of a cryptographic key, is implemented in the second computer program without the arithmetic or logic machine instructions and/or conditional instructions.

The compiler may be stored on a computer readable medium, i.e., tangibly embodied in a machine-readable storage device. The compiler may also be downloaded as a digital signal received over, e.g., a network, such as a wireless network, or the internet, etc. The compiler may be expressed as a computer controlled method for compiling.

The machine language is a language executable on a computer processor, possibly requiring a further linking step. Note that the second computer program may be linked to another computer program which was compiled with a different compiler. The second program may be executed, for example, on a computer comprising one or more memories and a processor, the processor comprising registers. The processor is configured to interpret a machine instruction set. Some machine instructions transfer data between memory and registers. Even if the machine instructions support instructions that operate on data, typically on a register, the compiler need not use them. For example, the compiler may be used to produce code for a processor that supports arithmetic and logic instructions; however the compiler avoids using them. The compiler also enables the use of processors that do not support arithmetic and logic instructions. The code generator may generate a stream of machine code instructions.

The compiler may comprise an input for receiving the program written in a first computer programming language. The compiler may comprise a parser configured to parse the first computer programming language, the code generator may be being configured to generate the machine language code under control of the parser. The parsing may be according to a grammar. For example, the parser may call code generator routines to generate code corresponding to language elements detected by the parser. The parser may generate an internal representation of the first program, for example by creating a parsing tree.

The compiler may comprise a lexical scanner for lexical analysis comprising converting a sequence of characters of the first program into a sequence of tokens of the first computer programming language. The lexical scanner could be run before the parser, or could be part of the parser.

In an embodiment, the generated machine language code does not contain conditional machine instructions. A conditional machine instruction is an instruction that performs a certain action if a conditional has specific values, and not otherwise. Conditional instructions include: conditional jump instructions, that only jump, say if a certain register has a certain value, conditional assignments, and so-called compare instructions that set or reset carry bits in case a register has a certain value. The compiler may avoid conditional instructions using pre-computed branch tables. A branch table is preferably implemented as a table of pointers from which the required jump address is retrieved. The address retrieved depends on the conditional. The branch table may also be implemented as a serial list of unconditional branch instructions that is branched into using an offset depending on the conditional. The offset is added to the base address through the use of tables or by routines that uses one or more tables to realize the needed addition. Note the 32 bit offset addition can be implemented by repeated use of small addition tables.

Conditional instructions are also an important source of side-channel information, since their power consumption is linked to whether or not a particular conditional is true or not, thus directly leaking information regarding the conditional.

In a preferred embodiment, the second computer program code is, so-called, "operator free". An operator free code comprises only move, i.e. load, operations, store operations for transferring data between registers and a memory, and jump operations. Through the use of operator-free code information leaking instructions like arithmetic and logical instructions, are avoided. It is noted that move, load and store operations are very amenable to encoding, e.g., by encoding the tables used. Thus any remaining power leakage may be reduced by encoding the tables. The operator free code may comprise: Load register with constant, load register with other registers, load register with value stored at memory address, store one or more registers at one or more memory addresses indicated by one or more registers, jump to memory address indicated by registers (or direct address), and jumps to address stored at memory address indicated by one or more registers.

It is noted that jump instructions may be avoided if the processor allows some type of manipulation of the program counter, preferably through move, or store operations. For example, if a load to the program counter is possible, wherein all sub register of this address register are loaded in a parallel, or at least loaded before the load of the next instruction takes effect, a jump may effected. In a preferred embodiment, the instruction set comprises a jump to the memory address stored in an address register. This allows conditional jumps to be implemented via the loading and storing to registers or part thereof.

In an embodiment, the load operations are for loading a register with one of: a constant, a value stored at a memory address, and another register; wherein the memory address is indicated by one or more registers and/or constants. In an embodiment, the store operations are for storing one or more registers and/or constants at one or more memory addresses, wherein the memory addresses are indicated by one or more registers values, and/or constants. In an embodiment, the jump operations are for jumping to a memory address, wherein the memory address is indicated by one or more registers and/or constants, or memory address is retrieved from a further memory address.

In an embodiment, the machine language acts on registers, a subset of the registers forming address registers for containing memory addresses. For example, each register comprises a number of bits, say 8 bits. And each address register comprises a number of registers, say 4. This allows table access without needing address computations, register dependent table access may be implemented by loading registers of an address register. This is important since it removes the addition (arithmetic) of the address calculating unit. This addition could also reveal information.

In an embodiment, some tables are stored at memory addresses which are a multiple of a power of two. The start of the table is stored at an address having the same number of zero least significant bits as there are bits in a register. In an embodiment, the start of some of the tables is stored at an address having the twice the number of zero least significant bits as there are bits in a register. Thus allows indexing in the tables by in effect concatenating constants and registers, thus avoided computations. Operands using multiple operands may be supported by placing table at an address having multiple numbers of zero bits.

In an embodiment where the tables of for instance addition and multiplication are stored at boundaries of powers of to there is no need to put other tables at boundaries of powers of two too. Using the tableized addition and multiplications we can compute any base+typesize*offset without the usage of arithmetic or logic support by the processor but through the use of the tableized addition or multiplication. So, other table access of table access of the program 1 or introduced tables of the at least semantically equivalent program 2 can be generated through the usage of the operator free code addition and or multiplication which are table driven.

In an embodiment, the compiler is configured to identify in the first computer program an operator, such as an arithmetic or logic machine operations, acting on one or more data items, the code generator being configured to produce machine language code for loading each one of the data items in a respective register of the same address register, loading data in the other registers of the address register so that the address register indicates a table entry, loading a result of the operator acting on the data items from the memory address indicated by the address register into a register. Identifying an operator in the first computer program may be directly identifying it, in the sense that the first program explicitly contains the operation. But the identifying may also be implicit, meaning that the compiler has translated the first computer program to an intermediate representation before generating the machine language code. Such an intermediate language may be register transfer language.

In an embodiment, the compiler is configured to identify in the first computer program a conditional jump, the code generator being configured to produce machine code for loading a register holding a value indicative of the conditional in a register of an address register, loading data in the other registers of the address register so that the address register indicates a table entry, jumping to the memory address stored in the memory at the memory address indicated by the address register.

An aspect of the invention concerns a computer configured as a compiler for compiling a first computer program written in a first computer programming language into a form without arithmetic and/or logic instructions, and/or without conditional instructions, optionally in operator free form.

An aspect of the invention concerns a compiler for compiling a first computer program written in a first computer programming language into a second computer program written in a second computer programming language. The compiler comprises a code generator to generate the second computer program by generating tables and second programming language code, the generated tables and the generated second programming language code together forming the second computer program, wherein the generated second programming language code references the tables and the generated second programming language code does not contain arithmetic or logic machine instructions, the tables comprising pre-computed results of arithmetic and/or logic machine instructions. The compiler for compiling a first computer program written in a first computer programming language into a second computer program written in a second computer programming language, can use the same techniques as the compiler for compiling a first computer program written in a first computer programming language into a second computer program written in a machine language, except that for the machine language instructions an equivalent from the second programming language must be chosen.

In one embodiment, the compiler is an electronic apparatus, e.g., having a central processing unit (CPU) and a memory coupled to said CPU for compiling a first computer program written in a first computer programming language into a second computer program written in a machine language. The apparatus comprises an input for receiving the first computer program written in a first computer programming language and a code generator to generate the second computer program by generating tables and machine language code, the generated tables and the generated machine language code together forming the second computer program. The generated machine language code references the tables and the generated machine language code does not contain arithmetic or logic machine instructions, the tables comprising pre-computed results of arithmetic and/or logic machine instructions.

An aspect of the invention concerns a method for compiling a first computer program written in a first computer programming language into a second computer program written in a machine language, the method comprising generating the second computer program by generating tables and machine language code, the generated tables and the generated machine language code together forming the second computer program, wherein the generated machine language code references the tables and the generated machine language code does not contain arithmetic or logic machine instructions, the tables comprising pre-computed results of arithmetic and/or logic machine instructions.

An aspect of the invention concerns a compiling method for compiling a first computer program, the method comprising compiling a first computer program written in a first computer programming language into a second computer program written in a second computer programming language that does not contain arithmetic or logic machine instructions, the tables comprising pre-computed results of arithmetic and/or logic machine instructions; and obtaining first tables and second programming language code, compiling a virtual machine program for interpreting the second computer program, the virtual machine program being written in a further first computer programming language, into a machine language does not contain arithmetic or logic machine instructions, the tables comprising pre-computed results of arithmetic and/or logic machine instructions, obtaining second tables and machine language code generated.

This construction wherein a computer program is compiled into a second computer program that is suitable for execution on a virtual machine, and combining it with a compilation of an interpreter for the virtual machine, both compilations being preferably operator free, is referred to as 'von Munchhausen' compilation. It provides both the protection conferred by operator free programs, but also the protection conferred by virtual machine execution, e.g. like sandboxing. The VM and program may be stand alone. Also features of the VM may thus be imparted on the combined result, e.g., code verification during execution, obfuscations etc.

Programs compiled according to the von Munchhausen construction have a special form; they have two sets of tables, one from each compilation, and one executable. An aspect of the invention concerns a computer program comprising first tables and second programming language code generated by compiling a first computer program written in a first computer programming language into a second computer program written in a second computer programming language by a compiler, second tables and machine language code generated by compiling a virtual machine program for interpreting the second computer program, the virtual machine program being written in a further first computer programming language, into a machine language by a compiler. One has the choice to share a table between the program and VM, or not. Even so, branch tables are typically private to the program and VM.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

In an embodiment, the generated tables are obfuscated, as show in the description. For example, if O represents an obfuscating encoding, the table may constructed for expression or operator f as: O (f(O−1(x), O−1(y))).

In an embodiment, the obfuscation is controlled by a key, which is input to the compiler. For example, the key may be used to generate a pseudo random stream, which is used to select obfuscating encodings. Interestingly, this links the particular compilation to a key; the link may later be used to fingerprint the software, e.g., to prove that a particular user was involved in the compilation of particular software. The key may be embedded in the compiler, possibly in a white box implementation. For example, producers of malware may be traced through the encodings used in the compiled product.

BRIEF DESCRIPTION OF THE DRAWINGS

These and other aspects of the invention are apparent from and will be elucidated with reference to the embodiments described hereinafter. In the drawings.

Figure 1:
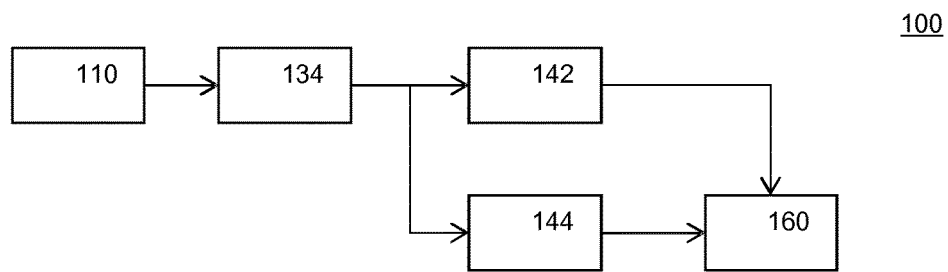
FIG. 1 is block diagram illustrating a compilation system.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates a compilation system 100. System 100 comprises a compiler 134. Also shown is a first computer program 110 written in a first computer programming language. Compiler 134 is configured to compile a computer program written in the first computer programming language into a machine language. Preferably, the first compiler compiles into operand free form, but this restriction may be relaxed, e.g., by allowing conditional operations. Compiler 134 produces tables 142 and a second computer program 144, which is operand free form of the first computer program 110 compiled into the machine language, for use with tables 142.

Computer program 144 and tables 142 can be executed together on computer 160. Computer 160 is configured for executing the machine language, and for receiving as input operand free program 144 for executing, and tables 142.

Figure 4:
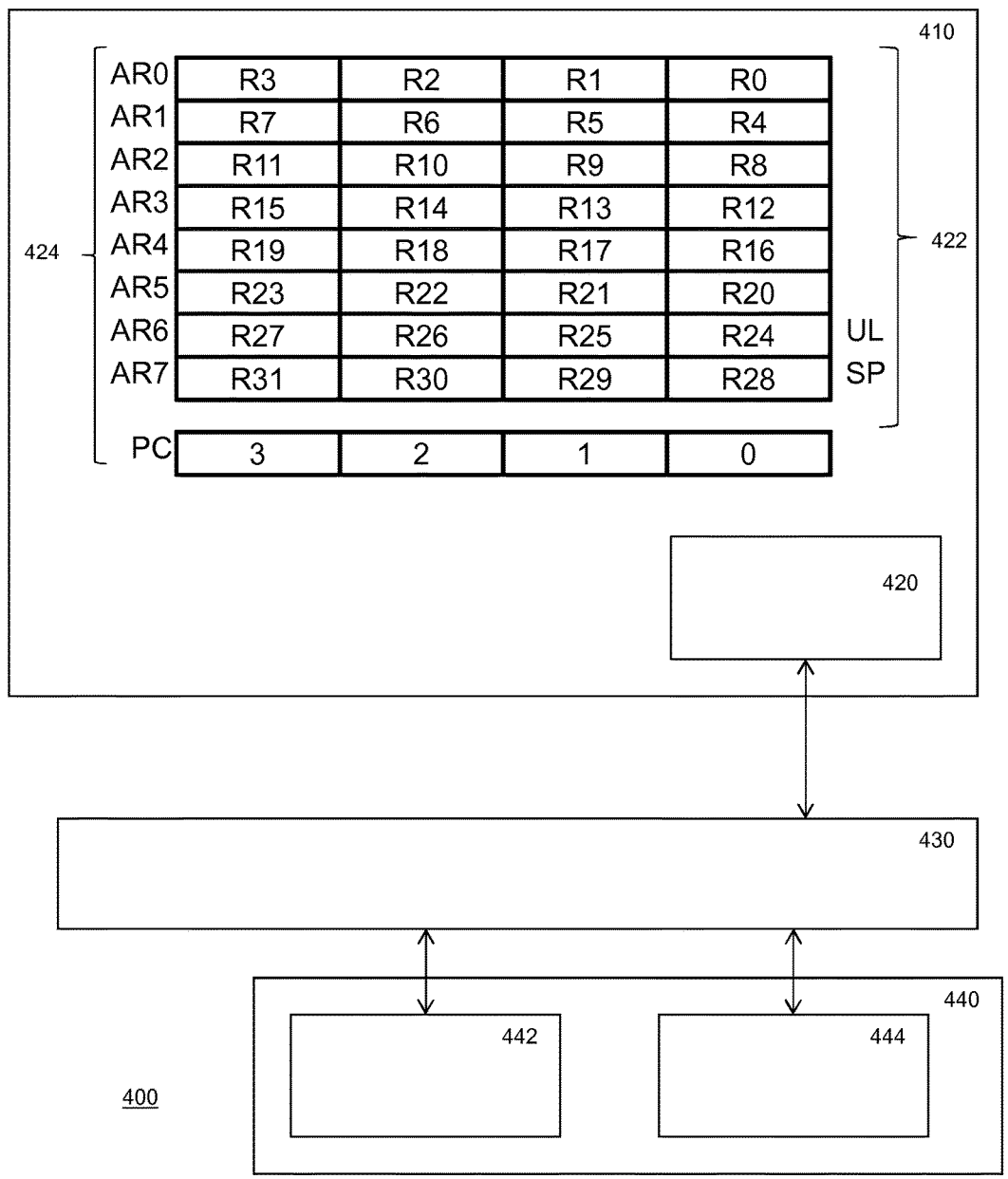
FIG. 4 is a block diagram illustrating computer

FIG. 4 shows a computer 400 suitable for execution of operator free machine language code.

FIG. 4 shows a computer processor 410, connected to a memory 440 via bus 430. In this particular embodiment memory 440 comprise two smaller memories: a non-volatile memory 442, and a volatile memory 444.

Processor 410 comprises general purpose registers 422 and address registers 424. Also shown is the program counter PC. Note that the address registers are made up of multiple general purpose registers; in this case 4 registers. The PC may be implemented like an address registers but it may be only addressable as a whole.

FIG. 4 shows two address registers marked as UL (unlink) and SP. The UL register may be used to save the value of the PC, for jumps to subroutines that themselves to not call subroutines. This optimization avoids some address computations, which is beneficial, especially if they are operator free. The usage of address register 6 as unlink register is optional. FIG. 4 further shows an optional stack pointer (SP). The stack pointer points to the top value of a stack. The stack may be used for parameter passing, or nested subroutines.

Although memory 440 is here made up of two memories (there may be more or fewer), for ease of description we will we will assume that memory 440 is addressable in a flat address space. We will also assume that memory 440 comprises executable machine code for execution by execution unit 420 and the corresponding tables. In a flat address space, also referred to as a linear memory model, the CPU can directly and linearly address all of the available memory locations without having to resort to memory segmentation or paging. However, this is not necessary, smaller address spaces may be supported, e.g., a non-flat address space may, e.g., be supported by taking the address space into account in the tables.

In this embodiment, the general purpose registers all have the same size, i.e. both the general purpose registers. It is advantageous if the size of the register is not too large, as it will lead to large tables. A good size for the registers is 8 bits. 4 bits is also possible but will lead to longer execution time, 16 bit is possible but this will lead to larger tables. Even larger registers are possible but in that case, it may be preferred to leave part of the registers unused, e.g., zero. FIG. 4 shows 32 general purpose registers, R0-R31. The address registers are made up of multiple general purpose registers.

Processor 410 supports a machine language, i.e., can execute machine language code. Processor 410 supports at least load and store operations to transfer data between registers (at least the general purpose registers and the load store address register(s)) and memory 440. In an example embodiment, processor 410 supports the following assignments:
Ri:=#constant (in showed case 0.255), Ri:=Rj; ARi:=ARj; PC:=ARi; ARi:=PC. The assignment of an address register to PC, may be interpreted as a jump instruction. The instructions may be labeled as a separate jump instructions, but may also be notated as a move operation.

Processor 410 also supports writing registers to memory, e.g., as addressed by an address register. For example: @ARi:=Ri represents a store via address register Ari. Some other non-operational instruction may be supported, e.g., a NOP, or some control instructions, which do not act on data, e.g., start and stop interrupts.

Note that some conventional processors support the above instructions. However such processors also support many instructions which are not used in operator free programs: first among them arithmetic and logic instructions, second conditional instructions. However, also many addressing modes are not used in operator free programs. For example, indexed addressing mode causes an addition which is an arithmetic operation. Nevertheless such processors may used, by not using the offending instructions. An advantageous processor only supports the instructions described above.

The table below illustrates how some common operations can be implemented in an operator free manner.

| Operation | Operator free compilation |
|---|---|
| Add R1, R2, R3 // meaning R1 := R2 + R3 | R3 := #0<br>R2 := #table address of add;<br>R0 := R3;<br>R1 := R2;<br>R4 := @AR0 |
| NOT R5 | R3 := #0; R2 := #0;<br>R1 := #table address of not;<br>R0 := R5;<br>R5 := @AR0 |
| JUMP address | R0 := #byte0 of address;<br>R1 := #byte1 of address;<br>R2 := # byte 2 of address;<br>R3 := #byte 3 of address;<br>PC:= AR0; |
| JUMP condition address1, address2 | - branch table J in memory<br>- condition is in Rj<br>R3 := #0;<br>R2 := #J;<br>R1 := #0;<br>R0 := Rj<br>PC := @LD |
| JUMP to subroutine | @AR7 := PC<br>// SP := SP + 4<br>R3 := #0;<br>R2 := #0;<br>R1 := #table address +4 table;<br>R0 := R28<br>R28 := @AR0<br>R4 := #byte0 of subroutine; R5 := #byte1 of subroutine | ...<br>PC:= AR1 |
| Return from subroutine | // SP := SP − 4<br>R3 := #0;<br>R2 := #0;<br>R1 := #table address −4 table;<br>r0 := SP0<br>R28 := @AR0<br>PC := @SP; // @AR7 |

Note that the use of subroutines is optional.

The values given above, i.e., addition or subtraction of particular values, may be adapted to a desired implementation, in particular to fit word sizes and computer architecture.

Figure 5:
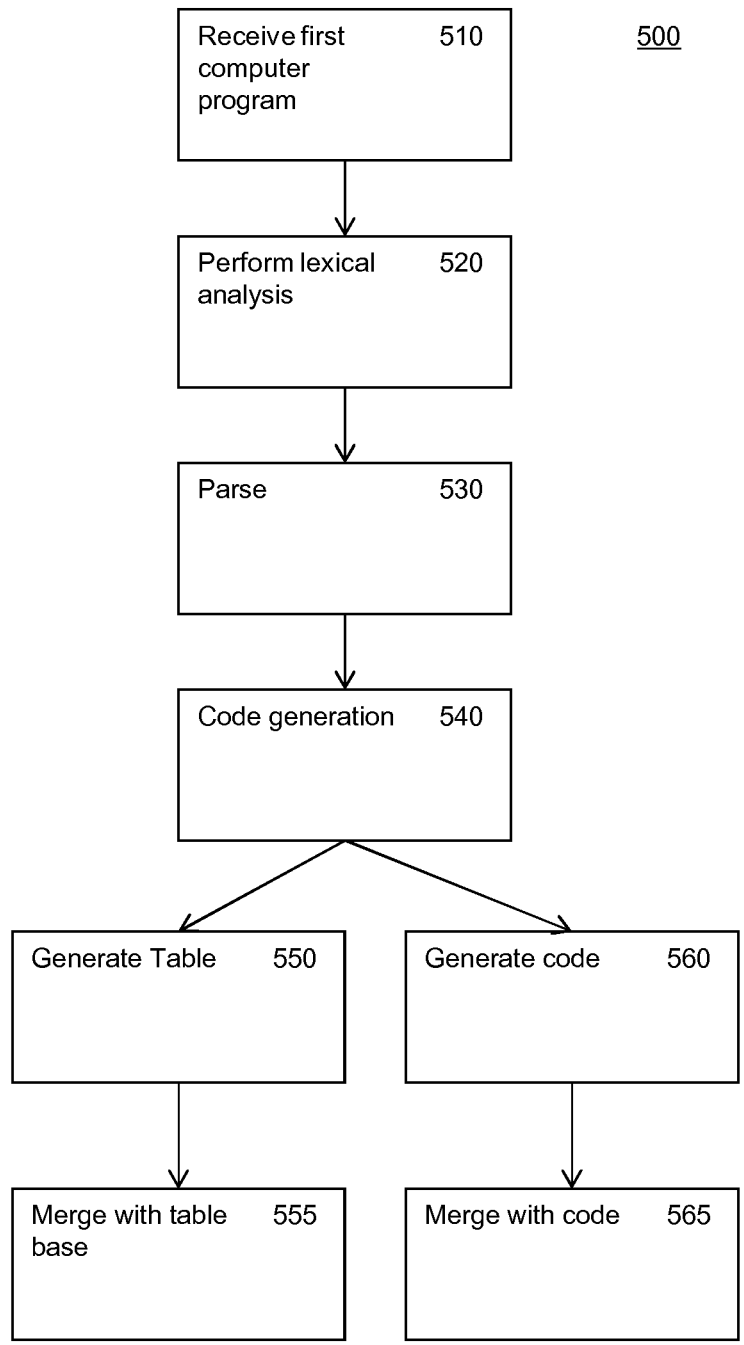
FIG. 5 is a flowchart illustrating compiling

FIG. 5 illustrates as flow chart a compiling method 500. In step 510 a first computer program is received. In step 520 a lexical analysis is performed, e.g., to identify tokens. Possibly processing such as macro expansion is also done. In step 530 the program is parsed. For example, the parser generates a parsing tree according to a formal grammar of the programming language of the first program. The parser identifies the different language constructs in the program and calls appropriate code generation routines. In step 540 code generation is done. During code generation some code is generated and if needed accompanying tables. In step 555 the generated tables are merged to a table base, since it may well happen that some tables are generated multiple times, in that case it is not needed to store them multiple times. E.g. an add-table may be needed and generated only once. In step 560 code is generated. In step 565 merging with code is performed. When all code is merged and all tables are merged the compilation is finished. Optionally, there may be an optimization step.

Figure 6:
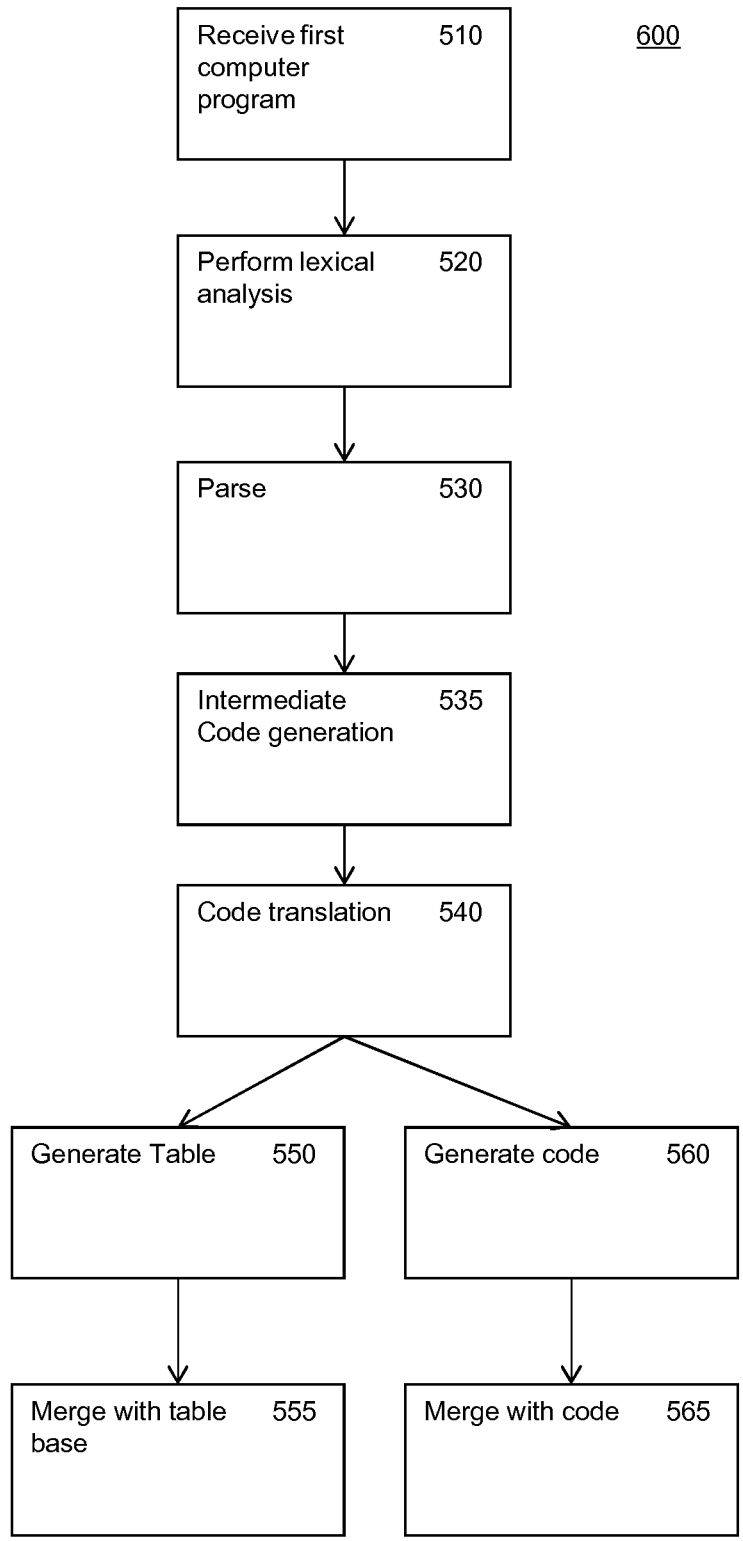
FIG. 6 is a flowchart illustrating compiling.

FIG. 6 illustrates as flow chart a compiling method 600 which is an interesting way to create the compiler. In step 535 an intermediate compilation is done. This may be to an intermediate language, e.g. register transfer language or the like, but may also be a machine language code compilation. This means that for steps 510-535 of FIG. 6 a conventional compiler may be used, which is not operator free. However in step 540 code generation is done based on the intermediate compilation. For example, if machine language code was used, each instruction is replaced by a corresponding operator free implementation of that instruction. This represents a particular straightforward way to create the compiler. FIGS. 5 and 6 may also be used to generate a compiler that produces not machine language but a second programming language.

Figure 3:
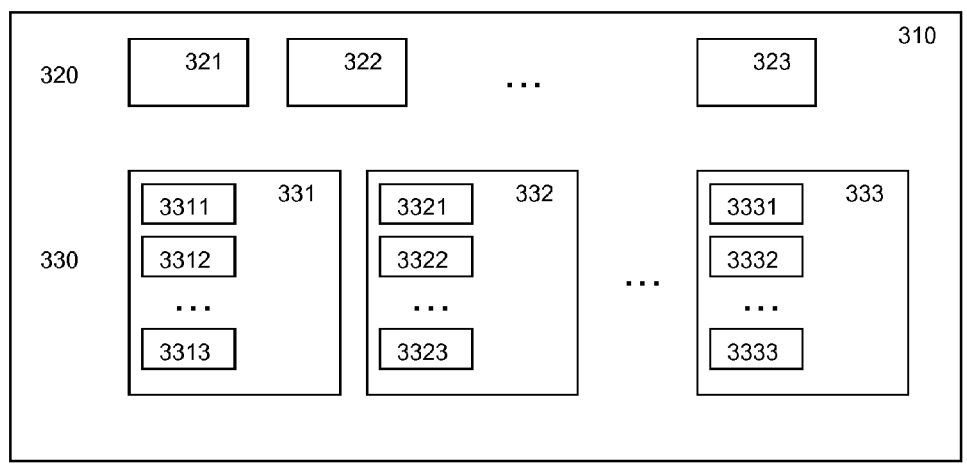
FIG. 3 is block diagram illustrating tables

FIG. 3 illustrates a memory 310 with tables. Shown are multiple monadic tables 320: tables 321, 322 and 323. A monadic table lists all outcomes of an operation applied to a single input. Note that the list may be in a natural order, say sequential, however also an encoding may have been applied, e.g., to increase randomization and/or obfuscation increasing resistance against side-channel and reverse engineering attacks.

Also shown are multiple dyadic tables 330: dyadic tables 331, 332, 333. The tables are curried and comprise multiple monadic tables, obtained by fixing an operand and varying the other. For example, dyadic table 331 contains tables 3311-3313, one table for each possible value of one, say the first, operand.

Assuming that 'n' is the bit size of a register. Monadic tables 321-323 have a start address that ends in at least n zeros. E.g. tables 321-323 have a start address like: 0xaa 0xbb 0xcc 0x00, each for some values of aa, bb and cc. Dyadic tables have a start address that that ends in at least 2n zero's. E.g., tables 3311, 3321 and 3331 have start addresses like; 0xaa 0xbb 0x00 0x00, each for some values of aa, bb. This has the advantage that table lookup in a dyadic table does not require address computation only concatenation of registers and/or constants. Instead of at the least significant end, the zero bits may also be placed elsewhere, this will have the effect of spreading the tables through the memory, increasing obfuscation.

Figure 2:
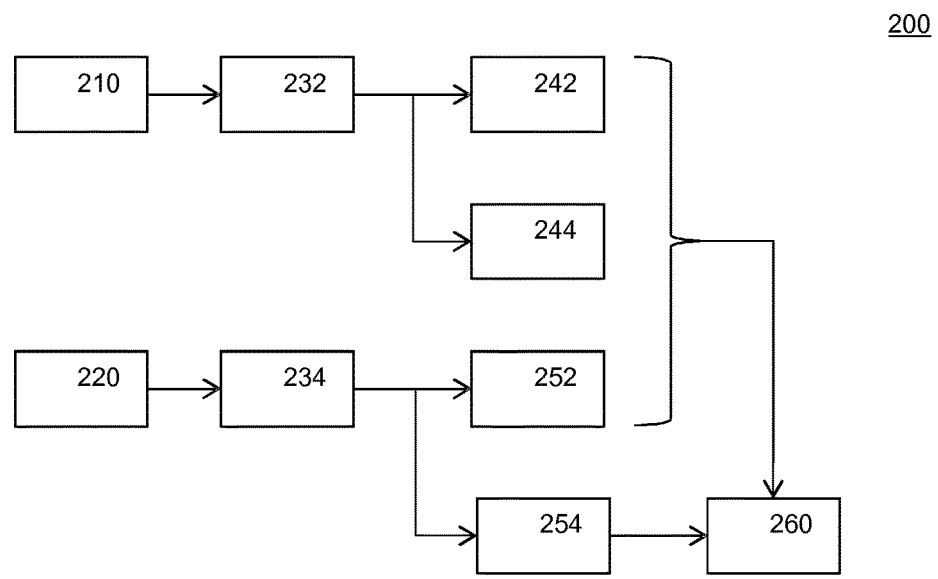
FIG. 2 is block diagram illustrating a compilation system.

FIG. 2 illustrates a compilation system 200. In FIG. 2 the so-called Munchhausen construction is used.

System 200 comprises a second compiler 234 configured to compile a computer program written in the second computer programming language into a machine language, the second compiler being configured for compiling into operand free form. Compiler 234 may be of the same type as compiler 134.

System 200 comprises a first compiler 232 configured to compile a computer program written in the first computer programming language into the virtual machine programming langue, the first compiler being configured for compiling into operand free form. For example, the virtual machine programming langue may be java byte code. Constructing a compiler 232 is very similar to constructing compilers 134 and 234, except that code generation uses code expressed in the virtual machine programming langue.

System 200 shows a first computer program 210 written in a first computer programming language, which is compiled by compiler 232 into tables 242 and computer program 244, which is an operand free form of the first computer program 210 compiled into the virtual machine programming langue, for use with tables 242.

System 200 also shows a virtual machine computer program 220 configured for interpreting a virtual machine programming language, the virtual machine computer program being written in a second computer programming language.

Virtual machine computer program 220 is compiled into tables 252 and computer program 254, which is an operand free form of the virtual machine computer program 220 compiled into the machine language, for use with tables 252.

The program 254 is executable by a computer 260 configured for executing the machine language. The program 254 runs together with table 242 and 252 and interprets program 244.

Interestingly, the tables 242 and 252 may be merged, so that the virtual machine shares tables with the program it executes. Typically virtual machines (VMs), interpreters, or emulators are programs which provide a well-defined interface in terms of instructions.

Typically, the compilers are implemented as a device comprising a microprocessor (not shown) which executes appropriate software stored at the device, e.g. that the software may have been downloaded and stored in a corresponding memory, e.g. RAM (not shown).

Below details are given of embodiments that further refine the embodiment shown in FIG. 2. Apart from control-flow instructions, the most common instruction of a VM performs an operation and stores the result thereof. These operations include well known operations like addition (+), subtraction (−), multiplication (*), etc. The compilers target these instructions, that is, it decomposes the expression written in some high level language into these known operations.

Tables may be used for all involved operations, both the operations in programs and the operations of the VM the program is executed on. Security may be further improved by endowing these tables with special features or properties.

For every operation, tables may be used. The table is defined according to the operation. For instance, for a monadic operator Opm $table_{Opm}[x]=Opm(x)$ or for a dyadic operator Opd $table_{Opd}[x][y]=Opd(x,y)$. Note, that for a non-monadic operation the compiler can implement the access to the table as multiple accesses, a process known as Curry. That is $X=table_{Opd}[x]$ followed by $X[y]$. Note: memory wise, for a data path of 8-bits, 14 dyadic operators, would require a memory usage equal to 1 megabyte, which is considered acceptable. Note that some or all tables may be stored in ROM and some or all tables may be stored in other memory, whether volatile or non-volatile.

The unity of compiler/linker and VM is maintained by, replacing the operation usage, by a table access of the operation. The underlying platform need only be used for jump instructions and writes/reads from/to registers and memory.

In a more advanced embodiment, compiler could implement complete expressions as tables. For instance the expression: $X^2+Y^2$ can be implemented through two multiplications and one addition, resulting in at least three operations (or more if Curried). However, it could also be implemented as a table of $X^2+Y^2$ and be compiled to an access of this table. This would result in one (two if Curried) table accesses. The unity between compiler/linker and VM can be maintained by passing the tables to the VM. Labeled tables become output of the compiler and input to the VM. In the code provided by the compiler, these labels are then referred to. This may be an improvement memory wise, since tables of unused operations may be omitted. In an embodiment the compiler comprises an expression unit for identifying the first program an expression that assigns a value to one, two or multiple numeric inputs, the code generator being configured to generate a table representing the result of the expression for all values of the numeric inputs. Interestingly, there need the expression need not be equal to an existing machine code instruction.

It is again noted that VMs are programs too, thus their program can be compiled in operator free form, e.g. towards tabelised operations too. Doing so for a program P to be executed on the VM and the VM itself would give four results as is shown in FIG. 2.
 1. Code of P which is going to be interpreted by the VM (program 244)
 2. Tables 242 of P.
 3. Operator free VM code 254, which is the code actually running on the underlying platform.
 4. VM Tables 252 These VM tables are linked to the operator free VM Code.

Note that tables 242 may be included in the VM program 220, even before its compilation. The decoder of the VM links these labeled tables to the labels in the interpreted code. The resulting code need only contain instructions that do table accesses, and possibly control instructions. The tables outputted by the compilers for program and VM respectively can be joined set wise and list wise, to the frame of the VM. Set wise joining of the tables has the advantage that fewer tables may be needed, so storage resources are reduced. Set wise joining has the disadvantage that the VM and P need to use the same encoding for the tables, to avoid this list joining may be used, in which P and VM have their own tables which are not shared.

In case tables are needed which are impractically huge, they can be programmed in terms of smaller tables which act as microinstructions with respect to the introduced properties or functionality.

In this section we describe a VM, on a high level, that may be used for the FIG. 2 construction. Through the VM additional properties or functionalities may be attached to the program. For reasons of compactness we focus on the addition. Other operations are treated similarly. After the description of the VM we will introduce a property over the instructions of it and discuss how the property is propagated. As examples, we have taken the property of obfuscation.

For reasons of compactness we only describe the main components of the VM. These main components are the main loop, the decoder and the usage of memory and register of the underlying platform.

```
The main loop is defined as
register pc = start;
while(true)
do
{
  Instruction x = fetch ( pc, memory );
  Decode_and_evaluate( x );
  pc = add[ pc,1];
      // through the use of brackets we try to indicated that the compiler
did his work and changed the operation into a table access
}
```

Before the loops start we see a register pc which contains the address of the first instruction to be evaluated.

In the loop we observe
 1. a fetch from memory of the instruction located at the location labeled by the value of pc,
 2. a decode and evaluation of the instruction and
 3. an increment of the value contained in the register pc, making the register (pc) refer to the next instruction.

Furthermore we have some registers x and y and memory where at the start address a add instruction is located.

```
Registers
   register x:
   register y:
Memory:
   ...
   address start       add_instruction
   address start+1     jmp_relative_8
   ...
The fetch operation does
   x = memory[ pc ];
```

Of the decode and evaluate of the simple VM presented we only provide the decode (by a C-like switch) and the evaluation done by an operation add.

```
Decode_and_execute (instruction)
{
    switch(instruction)
    { ...
        case add_instruction: x := add[ x, y ];
        ...
    }
}
```

The add represents the instruction which does
Add[x, y]==x+y;

It is stressed that the above is an example VM which may be used, other, even existing VM's may be used in the manner described.

Interestingly the Munchhausen VM may be endowed with obfuscation. For obfuscating the instructions, a first step may be to add the property of obfuscation to the existing functionality of the instructions. In the presented case to the add instruction. Suppose we use one obfuscation function O. Aim of the function O is to hide the semantics of the operation by a re-order of the in- and output values. O could be a permutation of the sets of inputs and outputs. The obfuscated add, denoted as <u>add</u>, could look like:
  <u>add</u>(x, y)==O(add[$O^{-1}$(x), $O^{-1}$(y)])

Note: The inputs and output of <u>add()</u>, are in the obfuscated domain. This has consequences for the instruction itself. To keep the original semantics we would need to obfuscate and de-obfuscate at the right moment.
  case add_instruction: x:=$O^{-1}$ (<u>add</u>[O(x), O(y)]);

However, by keeping in the registers the obfuscated values we can omit the de-obfuscation and obfuscation, resulting in case add_instruction: x:=<u>add</u>[x, y];

The VM may be redefined in terms of obfuscated instructions. For example, one may use the instructions of the virtual machine to implement the main loop of the VM itself. Again, we limit ourselves to the use of the obfuscated add instruction. Other instructions are dealt with similarly.

One may identify that there is an "add" in the main loop of the VM, namely
  pc:=add[pc,1];
Equivalently, using the obfuscated add, we have
  pc:=$O^{-1}$(<u>add</u>[O(pc), O(1)]);
By keeping in the register the obfuscated value PC=O (pc). The replacement could be: PC:=<u>add</u>[PC, O(1)];
Note: the constant has to be lifted towards the obfuscated domain.

Other occurrences of pc, like in this simple example, would be:

```
1. x = memory[ pc ];
2. pc = start;
```

-continued

```
The first case
    x = memory [ pc ];
this is equal to
    x = memory[ O⁻¹ ( O(pc) ) ];
Again the replacement would be:
    x = memory [ O⁻¹ ( PC ) ];
by re-arranging the memory[ ] over O⁻¹ we get
x = MEMORY[ ( PC ) ];   where MEMORY[x] ==
memory[O⁻¹(x)] for all x
Resulting in:
Memory:
    ...
    address O(start+1) ...
    ...
    address O(start)    add_instruction
    ...
```

The fact that O(start+1) is depicted before O(start) is just to indicate the reshuffling. It depends on the chosen obfuscation permutation. Note too that instructions that were sequentially aligned after each other through the use of the add become randomly distributed in the memory. We tacitly assume here that domain and range of O coincide with the memory indices.

The second case is now a logical consequence:
An equal statement would be
O(pc)=O(start);
Replacing gives
PC=O(start);

So start is lifted to the obfuscated domain (and the memory is reshuffled accordingly in the previous step). After all occurrences of pc are handled it should be clear that preferably we should handle all occurrence of memory[ ] too. That is replacing memory[ ] by MEMORY[ ]. This could have consequences for some other instructions again. These consequences extend to a closure since there is only finite number of instructions.

We mention that there are instructions like the jump relative instruction which implicitly use the add and the distance between the original location of instructions. This distance is computed by a subtraction.

On could specify this instruction as:
jmp_relative(distance) {pc=add[pc, distance]}
Applying the obfuscation scheme would result in
jmp_relative(y) {PC=add[PC, y];} where PC is obfuscated pc However now there is still a problem in the argument y. This argument should be recomputed at linking through O (address of the original jmp instruction)–O(target=address of the original jump instruction+distance)). The process is completed by transforming the instructions in terms of the underlying platform into tables.

Some words on the representation of the instructions and its decoder. It is clear that the representation of the instruction can be obfuscated. It could be obfuscated with any permutation. The representation of the instruction and the decoding are coupled but they have no link to other components of the VM. Therefore even an independent obfuscation can be used between instruction representation and the decoder.

It is noted that many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 540, 550 and 560 may be executed, at least partially, in parallel. Moreover, a given step may not have finished completely before a next step is started.

A method according to the invention may be executed using software, which comprises instructions for causing a processor system to perform methods 500 and 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1-4

100 a compiling system
110 a first computer program written in a first computer programming language
134 a first compiler configured to compile a computer program written in the first computer programming language into a machine language
142 tables
144 machine language code of the second computer program for use with tables
160 computer configured for executing the machine language, receiving as input machine code 144 and tables 142
200 compiling system
210 a first computer program written in a first computer programming language 220 a virtual machine computer program configured for interpreting a virtual machine programming language, the virtual machine computer program being written in a second computer programming language 232 a first compiler configured to compile a computer program written in the first computer programming language into the virtual machine programming langue 234 a second compiler configured to compile a computer program written in the second computer programming language into a machine language 242 tables 244 virtual machine programming langue code for use with tables 242

252 tables 254 machine language code of virtual machine computer program 220 for use with tables 252

260 computer configured for executing the machine language, receiving as input operand free program 254 for executing, and tables 242, 252 and program 244

310 a memory 320 multiple monadic tables 321-323 monadic tables 330 multiple dyadic tables 331-333 dyadic tables 3311-3333 monadic tables 400 a computer 410 a computer processor 420 an execution unit 422 general purpose registers 424 address registers 430 a bus 440 a memory 442 a non-volatile memory 444 a volatile memory

The invention claimed is:

1. A compiler running on a computer for compiling a first computer program stored on a non-transitory computer readable medium and written in a first computer programming language into a second computer program, the compiler running on the computer comprises a code generator to generate the second computer program by generating tables and machine language code, the second computer program consisting of the generated tables and the generated machine language code, the generated machine language code referencing the tables, wherein the compiler is configured to identify an arithmetic or logical expression in the first computer program, the identified expression depending on at least one variable, and the code generator is configured to generate one or more tables representing pre-computed results of the identified expression for multiple values of the at least one variable and to generate machine language code to implement the identified expression in the second computer program by accessing the generated one or more tables representing pre-computed results, wherein the machine language code generated to implement the identified expression does not contain arithmetic machine instructions, wherein the machine language code generated to implement the identified expression is operator free consisting of load and store operations for transferring data between registers and a memory, and unconditional jump operations, and wherein the machine language code generated to implement the identified expression does not contain conditional machine instructions, and wherein the compiler is configured to identify a conditional expression dependent on a conditional in the first computer program, and the code generator is configured to generate one or more pre-computed branch tables for the identified expression for multiple values of the conditional and to generate machine language code to implement the identified expression in the second computer program by accessing the generated one or more branch tables.

2. The compiler as in claim 1, wherein the load operations are for loading a register with one of: a constant, a value stored at a memory address, and another register; wherein the memory address is indicated by one or more registers and/or constants.

3. The compiler as in claim 1, wherein the store operations are for storing one or more registers and/or constants at one or more memory addresses, wherein the memory addresses are indicated by one or more registers and/or constants.

4. The compiler as in claim 1, wherein the jump operations are for jumping to a memory address, wherein the memory address is indicated by one or more registers and/or constants, or memory address is retrieved from a further memory address.

5. The compiler as in claim 1, wherein the machine language acts on registers, a subset of the registers forming address registers for containing memory addresses.

6. The compiler as in claim 1, wherein the compiler is configured to identify in the first computer program an expression acting on one or more data items, the code generator being configured to produce machine language code for
loading each one of the data items in a respective register of the same address register,
loading data in the other registers of the address register so that the address register indicates a table entry,
loading a result of the operator acting on the data items from the memory address indicated by the address register into a register.

7. The compiler as in claim 1, wherein the compiler is configured to identify in the first computer program a conditional jump, the code generator being configured to produce machine code for
loading a register holding a value indicative of the conditional jump in a register of an address register,
loading data in the other registers of the address register so that the address register indicates a table entry,
jumping to the memory address stored in the memory at the memory address indicated by the address register.

8. A computer comprising a compiler for compiling a first computer program stored on a non-transitory computer readable medium and written in a first computer programming language into a second computer program, wherein the compiler comprises: a code generator to generate the second computer program by generating tables and machine language code, the second computer program consisting of the generated tables and the generated machine language code, the generated machine language code referencing the tables,
wherein the compiler is configured to identify an arithmetic or logical expression in the first computer program, the identified expression depending on at least one variable, and the code generator is configured to generate one or more tables representing pre-computed results of the identified expression for multiple values of the at least one variable and to generate machine language code to implement the identified expression in the second computer program by accessing the generated one or more tables representing pre-computed results, wherein the machine language code generated to implement the identified expression does not contain arithmetic machine instructions, and wherein the machine language code generated to implement the identified expression is operator free consisting of load and store operations for transferring data between registers and a memory, and unconditional jump operations, and wherein the machine language code generated to implement the identified expression does not contain conditional machine instructions, and wherein the compiler is configured to identify a conditional expression dependent on a conditional in the first computer program, and the code generator is configured to generate one or more pre-computed branch tables for the identified expression for multiple values of the conditional and to generate machine language code to implement the identified expression in the second computer program by accessing the generated one or more branch tables.

9. A compiling method for compiling a first computer program written in a first computer programming language into a second computer program, the method comprising acts of:

generating by a compiler of a computer the second computer program by generating tables and machine language code, the second computer program consisting of the generated tables and the generated machine language code, the generated machine language code referencing the tables; and identifying an arithmetic or logical expression in the first computer program, the identified expression depending on at least one variable; and generating one or more tables representing pre-computed results of the identified expression for multiple values of the at least one variable and to generate machine language code to implement the identified expression in the second computer program by accessing the generated one or more tables representing pre-computed results, wherein the machine language code generated to implement the identified expression does not contain arithmetic machine instructions, wherein the machine language code generated to implement the identified expression is operator free consisting of load and store operations for transferring data between registers and a memory, and unconditional jump operations, and wherein the machine language code generated to implement the identified expression does not contain conditional machine instructions, and wherein the compiler is configured to identify a conditional expression dependent on a conditional in the first computer program, and the code generator is configured to generate one or more pre-computed branch tables for the identified expression for multiple values of the conditional and to generate machine language code to implement the identified expression in the second computer program by accessing the generated one or more branch tables.

10. The compiling method as claimed in claim 9, wherein the first computer program is a virtual machine program for interpreting a fourth computer program, the method further comprising an act of:

compiling a third computer program written in a third computer programming language into the fourth computer program written in a fourth computer programming language by performing acts of:

generating the fourth computer program by generating further tables and fourth programming language code, the further tables and the fourth programming language code together forming the fourth computer program, the generated fourth programming language code referencing the further tables;

identifying an arithmetic or logical expression in the third computer program, the expression depending on at least one variable; and generating one or more tables representing pre-computed results of the identified expression for multiple values of the at least one variable and to generate fourth programming language code to implement the identified expression in the third computer program by accessing the generated one or more tables representing pre-computed results.

11. A computer program comprising a compiler and a code generator stored on a non-transitory computer readable medium for execution by a processor to perform a method comprising acts of:

generating by the compiler of a computer the second computer program by generating tables and machine language code, the second computer program consisting of the generated tables and the generated machine language code, the generated machine language code referencing the tables; and identifying an arithmetic or logical expression in the first computer program, the identified expression depending on at least one variable; and generating one or more tables representing pre-computed results of the identified expression for multiple values of the at least one variable and to generate machine language code to implement the identified expression in the second computer program by accessing the generated one or more tables representing pre-computed results, wherein the machine language code generated to implement the identified expression does not contain arithmetic machine instructions, wherein the machine language code generated to implement the identified expression is operator free consisting of load and store operations for transferring data between registers and a memory, and unconditional jump operations, and wherein the machine language code generated to implement the identified expression does not contain conditional machine instructions, and wherein the compiler is configured to identify a conditional expression dependent on a conditional in the first computer program, and the code generator is configured to generate one or more pre-computed branch tables for the identified expression for multiple values of the conditional and to generate machine language code to implement the identified expression in the second computer program by accessing the generated one or more branch tables.

12. The compiler as in claim 1, wherein the generated tables are merged into a table base and the table base is stored such that a table generated more than once is only stored once.

13. The computer as in claim 8, wherein the generated tables are merged into a table base and the table base is stored such that a table generated more than once is only stored once.

14. The computer method as in claim 9, further comprising acts of:
 merging the generated tables are into a table base; and
 storing the table base such that a table generated more than once is only stored once.

15. The computer program as in claim 11, wherein the generated tables are merged into a table base and the table base is stored such that a table generated more than once is only stored once.

* * * * *